United States Patent [19]

Douros, Jr. et al.

[11] 4,196,290

[45] Apr. 1, 1980

[54] METHOD OF OBTAINING URIC ACID FROM NATURAL PRODUCTS

[75] Inventors: John D. Douros, Jr., Littleton; Ira T. Warder, Jr., Lakewood, both of Colo.

[73] Assignee: The Gates Rubber Company, Denver, Colo.

[21] Appl. No.: 389,392

[22] Filed: Aug. 15, 1973

Related U.S. Application Data

[62] Division of Ser. No. 80,517, Oct. 7, 1970, Pat. No. 3,850,930.

[51] Int. Cl.$^2$ ............................................. C07D 473/04
[52] U.S. Cl. ..................................................... 544/266
[58] Field of Search .......................... 260/255; 544/266

[56] References Cited

U.S. PATENT DOCUMENTS

| | | | |
|---|---|---|---|
| 1,496,834 | 6/1924 | Thompson | 71/21 |
| 2,302,204 | 11/1942 | Gable et al. | 260/255 |
| 2,906,615 | 9/1959 | Dumore | 71/18 |
| 3,547,612 | 12/1970 | Westelaken et al. | 71/21 |

OTHER PUBLICATIONS

Journal of Insect Physiology, vol. 15, No. 7, 1969, pp. 1129–1135.

*Primary Examiner*—Paul M. Coughlan, Jr.
*Attorney, Agent, or Firm*—Raymond Fink; H. W. Oberg, Jr.; Curtis H. Castleman, Jr.

[57] ABSTRACT

This invention relates to improvements and methods of beneficiation of uric acid and primary salts of uric acid. The compounds are obtained by treating fowl excrement or waste material by means of first promptly collecting the waste material; removing the moisture therefrom, and then subsequently grinding and fractionating this material according to particle size. The method results in fractions of the original waste material which have increased concentrations of uric acid. The enrichment in uric acid concentration results in a material which is very suitable for final removal and treatment of the contained uric acid. A process for the extraction of high purity uric acid and primary salts of uric acid from the pretreated waste is also disclosed. The invention includes the utilization of the drying and sieving process of the waste material to obtain portions from the original product which is suitable for animal feed and supplements.

1 Claim, 1 Drawing Figure

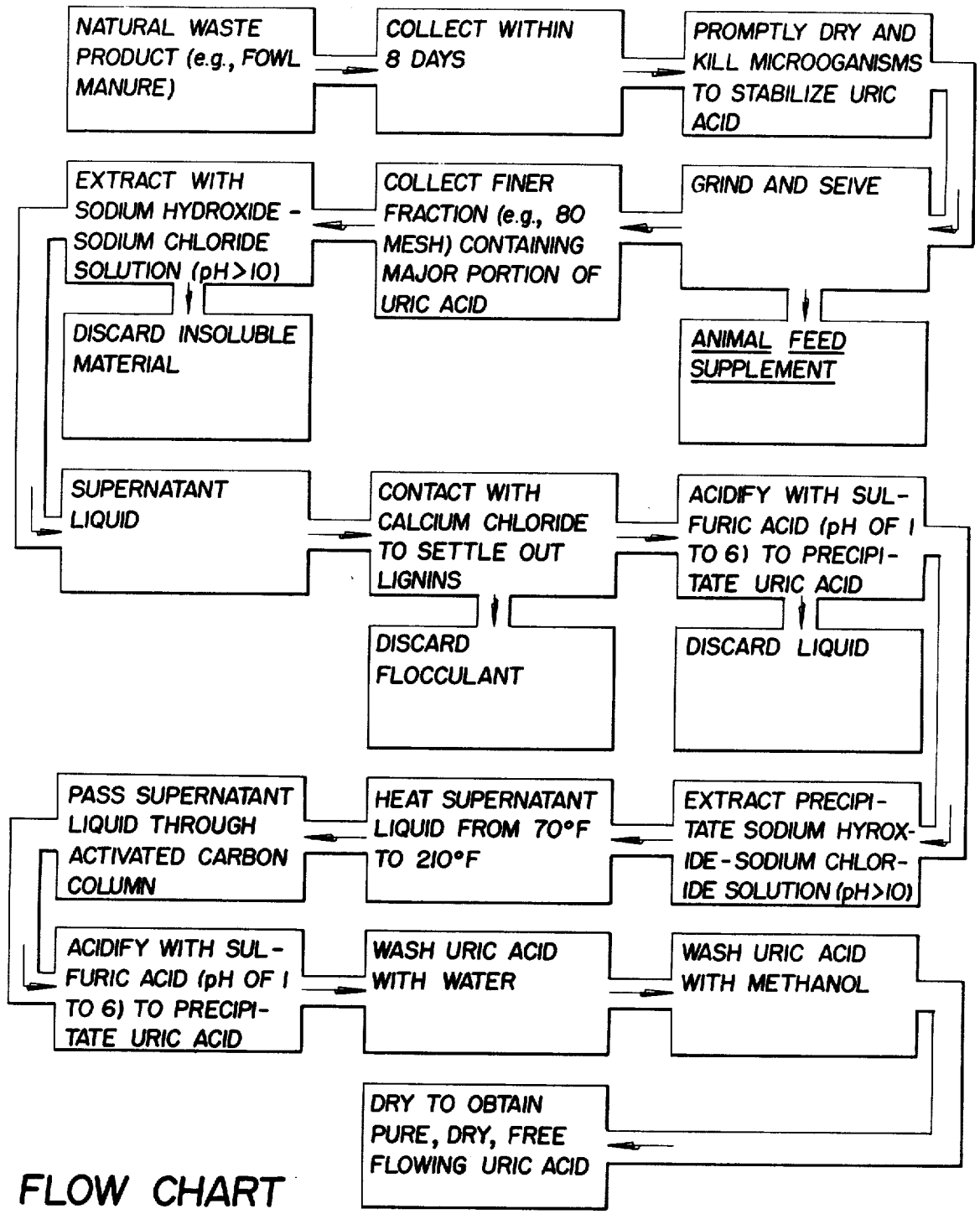
FLOW CHART
A PREFERRED METHOD OF OBTAINING PURE URIC ACID AND ANIMAL FEED SUPPLEMENT FROM WASTE MATERIAL

METHOD OF OBTAINING URIC ACID FROM NATURAL PRODUCTS

This is a division of U.S. patent application, Ser. No. 80,517 filed on Oct. 7, 1970 now U.S. Pat. No. 3,850,930 issued Nov. 26, 1974.

BACKGROUND OF THE INVENTION

It has been known that certain animal, reptile and fowl excrement contain various nitrogenous materials, a significant portion of which may be found as uric acid. Uric acid has the empirical formula $C_5H_4N_4O_3$. The structural formula is:

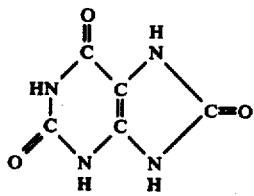

A major source of uric acid in the past has been marine bird guano obtained primarily in the Galapagos Islands. A process has been described in U.S. Pat. No. 2,302,204 for obtaining uric acid from bird guano. The process described therein involves numerous dissolution and precipitation steps, many of which are carried out at elevated temperatures in a highly alkaline media which is known to degrade uric acid. The complexity of this process, as well as the product loss which is caused by conditions under which it is carried out, leave much room for improvement. On the other hand, improvements described herein disclose steps in which the raw material is promptly collected, dried, ground and sieved. These preliminary steps constitute an improvement which involves very few steps but yet results in the beneficiation of a very pure, high concentration or product in very high yields.

Disadvantages in the prior art overcome by the practice of the novel process of the present invention, which yields a substantially pure or pure (chemical and pharmaceutical grade) uric acid (in extremely high yields) which is characterized by exhibiting an improved color, i.e., is essentially colorless or white, has an extremely low concentration of impurities, and is prepared in a convenient, economical and efficient manner. In accordance, then, with the present invention, it has been found possible to prepare pure (chemical and pharmaceutical grade) uric acid, in very high yields, having the aforementioned characteristics, which has heretofore not been obtainable by prior art processes on a large scale. Additionally, the process as described herein is adaptable to obtaining substantially pure primary salts of uric acid having the empirical formula of $MHC_5H_2N_4O_3$ in which "M" is an alkali earth metal.

Uric acid is known in the art to have a significant value as a chemical compound and consequently, has a wide variety of uses. Uric acid, for example, can be used for the commercial production of allantoin, alloxan, alloxantin, parabanic acid, murexide and other derivatives. Uric acid and its salts, for example, have been and are still being used on occasion in medicine. It has been used internally for edematous heart, pulmonary tuberculosis, persecution mania, et cetera, and also externally in gout. A 4% ointment of ammonium urate has been used in the treatment of chronic eczema and also internally for coughs and grippe. Lithium acid urate is used as an antarthritic, and murexide is used as an organic indicator for the determination of calcium and other metal ions.

The beneficiation method disclosed herein is particularly adaptable to utilization of waste material obtained from large commercial bird establishments such as turkey and chicken farms. Thus, in addition to providing a method for obtaining a valuable raw material such as uric acid and its primary salts, the process provides a solution for serious disposal problems and for obtaining a valuable animal feed and supplement.

SUMMARY OF THE INVENTION

This invention relates to utilization of mechanical steps of treatment of fowl waste material or excrement for obtaining either uric acid, primary salts of uric acid or a material for use as feed and supplement. The invention relates to a novel process for modifying fowl waste material by prompt collection of the material after its production, generally within a 48-hour period. Prompt collection and treatment of the waste material minimizes the microbial degradation of the naturally occurring uric acid. The prevention of the microbial degradation also minimizes accumulation of metabolic by-products.

The raw material containing uric acid is then dried for a sufficient period of time and at a sufficient temperature to substantially terminate biological degradation thereof, to form a raw material which has a substantially stabilized uric acid content. Next, the stabilized uric acid containing raw material is ground, sieved and separated into two separate fractions, a first fraction constituting said raw material characterized by having a major portion of the stabilized uric acid and a second fraction constituting said raw material characterized by having a minor portion of said stabilized uric acid. The first fraction is reacted with a sufficient amount of an aqueous alkaline-brine solution, which is capable of dissolving substantially all of the stabilized uric acid in the concentrated fraction, to form a uric acid solution containing insoluble impurities. The insoluble impurities are removed from the solution of dissolved uric acid. A sufficient amount of a flocculating agent is mixed with the uric acid solution to form a slurry containing other insoluble impurities. The additional other insoluble impurities are removed from the slurry to form a purer uric acid solution. The second solution is reacted with a sufficient amount of an acidic material to form a uric precipitate. The precipitate is then extracted with a sufficient amount of an alkaline aqueous solution to dissolve substantially all the uric precipitate to form a third uric solution. The third fluid is reacted with a sufficient amount of an acidic material to form a precipitate in the third fluid and which is substantially pure uric acid.

At this point, the pure or substantially pure uric acid precipitate can be separated and used as such or, if it is desired to store them to ship to a customer, the solution with the precipitated uric may then be treated to remove the bulk of the third fluid, washed and subsequently dried.

It is, therefore, an object of this invention to obtain extremely pure uric acid from normally waste material.

It is a further object of this invention to provide mechanical means for beneficiation of uric acid and other useful nitrogenous materials in normally waste products.

It is another object of this invention to provide novel processes for the manufacture and production of substantially pure uric acid from natural sources such as chicken manure.

It is a further object of the present invention to provide novel processes for producing purified uric acid substantially free of color-producing bodies and/or other impurities.

It is another object of this invention to provide an economical method of producing a low cost feed and supplement, from normally waste material.

TECHNICAL DISCLOSURE

A uric acid bearing raw material is utilized as the starting material in the processes in this part of the present invention. The term "waste material," as used herein, designates and means excrement of any reptiles, birds and fowl which contains uric acid. Such waste material is collected and dried generally within a seven-day period, preferably a 48-hour period, and most preferably a 24-hour period, from the time that the excrement is produced.

Birds or fowl such as chickens and turkeys are known to excrete material containing uric acid; however, the content previously reported is relatively low, e.g., 2 to 3% by weight. One of the unique facets of the present invention, however, relates to the fact that substantially higher uric acid containing raw materials can be obtained. It has been found that aging of fowl or reptile excrement or waste material will do much to decrease the amount of naturally occurring uric acid occurring in the waste material because of microbial attack. With moisture content in excess of 10% rapid microbial attack can be maintained on the naturally occurring uric acid itself since it can serve as the sole source of carbon and nitrogen necessary for microbe existence. Data indicates that material collected and processed within a 24-hour period will show a 6 to 8% higher yield than that previously reported in the literature. Thus, fresh chicken waste will actually contain as high as 5 to 12% uric acid. The yield may drop to as low as 1.5% uric acid at the end of a 24-hour period and as low as 0.7% in 48 hours. Material that is 120 hours old will generally show less than 0.1% of uric acid but may show as little as 0.07%. Finally, material that is 8 days old will invariably show less than 0.05% or only negligible amounts. One of the inventive portions of this process, therefore, is the prompt collection of fresh material and processing of the waste material to obtain optimum yield of uric acid. The recommended limit is to make collections within a 48-hour period of time, but the most preferred method is to make collections daily.

It has also been observed that uric acid varies in the waste product due to the diet, age and health of the chickens. The consistency of the wet and the dry waste material also changes according to the diet of the chickens. If the diet consists mainly of fish meal, the uric acid and lysine content of the waste material increases. On the other hand, if soy is fed, the waste material is much more fibrous. Some illustrations of the effect of diet on the uric acid content of the dried waste is shown in Table I.

TABLE I
Uric Acid Content of Specific Sieved Fractions of Chicken Waste from Two Different Diet Sources

| | Mesh Size | Uric Acid Concentration % By Weight of Dried Waste |
|---|---|---|
| Cotton Seed and fish meal | Greater than 50 | 1.15 |
| | 50 to 80 mesh | 1.11 |
| | 80 to 120 mesh | 0.25 |
| | 120 to 170 mesh | 0.32 |
| | 170 to 200 mesh | 0.60 |
| | 200 to 270 mesh | 4.35 |
| | Less than 270 mesh | 0.75 |
| | TOTAL | 8.52 (purity 87%) |
| Soybean meal diet with high corn | Greater than 50 | 0.82 |
| | 50 to 80 mesh | 0.72 |
| | 80 to 120 mesh | 0.78 |
| | 120 to 170 mesh | 5.01 |
| | 170 to 200 mesh | 1.70 |
| | 200 to 270 mesh | 0 |
| | Less than 270 mesh | — |
| | TOTAL | 9.03 (purity 74%) |

After the prompt collection of the waste material, the next subsequent step, therefore, is a drying process which will terminate decomposition or degradation due to microbial action. Such drying is desirable since the waste material ordinarily consists of from 70 to 80% water. A number of drying methods are known in the art, most of which may be utilized. Drum driers, fluid bed driers and flash driers are the ones preferred in this process. The flash drier or drum drier seems to be the more desirable methods since oven drying tends to scorch the material. Oven drying also tends to form clumps of the product. When such clumping occurs, higher temperatures must be used in order to assure complete microbial kill. It has been found that complete kill of all microbes may be obtained at 390° F. However, a high carbohydrate diet waste will caramelize at a higher temperature. Reference to Table II shows this relationship. However, a drying range of 140° to 390° F. is quite acceptable if the process is to be carried out for the extraction of pure uric acid. The preferred procedure is to utilize a drying step until the moisture has been reduced to 5 to 15% weight of water. The drying procedures not only allow one to work on a more concentrated material, but it also minimizes handling and disease problems.

TABLE II
Destruction of Microorganisms in Dried Fowl Waste as a Function of Drying Temperature

| Wet fowl waste | $22 \times 10^8$ Organisms per Gram |
|---|---|
| 265° F. (Flash drying) | $2 \times 10^3$ Organisms per Gram |
| 280° F. (Flash drying) | $0.5 \times 10^3$ Organisms per Gram |
| 300° F. (Flash drying) | $0.25 \times 10^3$ Organisms per Gram |
| 350° F. (Flash drying) | No Organisms |

In addition to diet having effect on the uric acid content, it has also been found, and is a specific embodiment of this invention that specific sieved fractionations of the dried waste material will tend to concentrate the uric acid in the smaller sieved fractions. The relation of uric acid content to specific sieve fractions is also illustrated in Table I.

Referring again to Table I, an interesting observation may be made. It is obvious that higher uric acid concentration will be found in the smaller mesh sizes. For instance, in the cotton seed and fish meal diet, almost 75% of the uric acid is found in the less than 80 mesh sieve sizes. In the soybean meal diet, the result is even more dramatic with 83% of the uric acid found in the less than 80 mesh diet.

Thus, a very important part of this invention is a grinding and separation procedure for the material according to a proper particle size classification. This is true regardless of the fact that it was shown that the yield of uric acid will vary according to the diet of the fowl. Very great beneficiation of uric acid can be found by classifying and obtaining the fraction of less than 80 mesh. Accordingly, after drying, the material is ground using commonly known methods such as a hammer mill, ball mill, or rod mill. The material is then sifted through various screens of up to 325 mesh. It has been unexpectedly found and discovered in conjunction with the experimentation of the present invention, that if the dried raw material is milled to provide a product which has an average particle size diameter of less than 2,000 microns, preferably less than 1,000 microns, and then subjected to a sieving operation on a screen which is no larger than a No. 20, and preferably a No. 50 and most preferably a No. 80 mesh U.S. Standard screen, the resultant smaller sized fraction passing therethrough will contain a major portion by weight of the uric acid, based on the total weight of the uric acid in the total dried raw material being sieved. By the same token, this minus 80 mesh fraction will constitute generally only from about 50% by weight of the raw material, based on the total weight of the dried raw material being sieved, or 85% by weight of minus 50 mesh fraction.

The concentration of uric acid in the 325 mesh particle size fraction of the dried fowl waste is illustrated by the fact that uric acid of greater than 75% purity can be obtained from the less than 325 mesh material using air classification. It is not necessary, however, to utilize such a small mesh concentration. For example, the less than 80 mesh particle size fraction which constitutes from 30 to 40% of the total dry weight, contains from 70 to 85% of the total uric acid content. Generally speaking, there is no particular gain by utilizing the smaller mesh fractions. Very little increased uric acid content is obtained by collecting 120 mesh rather than the 80 mesh fraction. On the other hand, the uric acid content and the fraction of 50 mesh or less drops to only 10 to 15% of the amount found in the finer fraction. It is, therefore, preferred to sieve the dry material and collect the less than 80 mesh size material. It is thus seen that merely by utilizing this single important mechanical step a high beneficiation of uric acid can be obtained.

Beneficiation of the uric acid content resulting from the grinding and separation according to particle size is illustrated by the data in Table I. The grinding and sieving of dry fowl waste produces materials which have feed and supplement value. A dried fowl waste sieved through a 120 mesh screen gives two fractions quite different in chemical make-up, thus, different in industrial value.

TABLE III

| Material | Effect of Particle Size on Analysis of Dried Fowl Waste | |
|---|---|---|
| | Greater than 120 Mesh (% by Wt.) | Less than 120 Mesh (% by Wt.) |
| Crude fats | 2.4 | 1.3 |
| Silicates | 1.6 | 1.8 |

TABLE III-continued

| Material | Effect of Particle Size on Analysis of Dried Fowl Waste | |
|---|---|---|
| | Greater than 120 Mesh (% by Wt.) | Less than 120 Mesh (% by Wt.) |
| Carbohydrates | 8.9 | 8.5 |
| Phosphorus | 2.0 | 2.4 |
| Calcium | 10.7 | 6.5 |
| Magnesium | 0.4 | 0.2 |
| Uric Acid | 5.0 | 23.0 |
| Nitogen | 4.6 | 8.7 |
| Crude Fibers | 11.8 | 9.4 |

In the data shown in Table III, the greater than 120 mesh fraction represented 73% of the total dried waste, whereas the less than 120 mesh represented 27% of the total dried waste. It is, thus, obvious that the concentration according to particle size not only enriches or beneficiates the material, but it cuts down drastically on the weight percent of material which must be handled. The data in Table III is illustrative of the usefulness of this process in obtaining a product from fowl waste which has utility as an animal feed and supplement. Either fraction or the entire material is suitable for animal food use. This beneficiation and obtaining of feed and supplement is, therefore, a part of this invention.

A product can be obtained which functions as a non-protein nitrogen supplement for use in animal feed and supplement and has other nutrient value which is readily recognized by those who are familiar with animal nutrition. Uric acid itself has been found to be a good non-protein, nitrogen source. The uric acid can serve as a non-protein, nitrogen source material which can be used for feed cattle, dairy cattle, range cattle, swine and sheep. Because of the slow releasing properties of uric acid, bloating is not a problem when this material is used as a non-protein, nitrogen source in the diet. In addition, this product has an increased value due to its mineral concentration, carbohydrate concentration and crude fat concentration. Uric acid would be a better source than urea for non-protein, nitrogen for use in ruminant animals since uric acid releases less gaseous ammonia.

In general, this part of the invention provides a process for preparing an animal feed and supplement and which comprises the steps of: (1) promptly collecting a freshly produced uric acid containing waste material; (2) drying suitable raw material for a sufficient period of time at a sufficient temperature to substantially completely terminate biological degradation thereof, to form an animal feed and supplement which has a substantially completely stabilized uric acid content and; (3) milling the stabilized uric acid containing animal feed and supplement to a suitable size for subsequent internal consumption by said animal.

The drying of the raw material is of importance to the process. Specifically, this drying step takes place at a temperature of at least 350° F. It is found that at temperatures less than about 350° F. there is a possibility of microorganisms present which cause fermentation in the raw material. The fermented raw material, in turn, may be toxic to animals. However, with the heating of the raw material, the resulting product is an excellent animal feed and supplement and growth stimulator.

The drying takes place for a period of time sufficient to reduce the moisture content of the raw material to less than about 10% by weight, based on the total weight of the wet raw material and preferably to a moisture content of from about 1% to about 9% by weight.

The dry raw material is then milled for a sufficient period of time, preferably to produce a product which has a particle size of less than 2,000 microns. At this point the product can be utilized as such or the milled dry raw material may be formed for an animal feed and supplement for subsequent internal comsumption by the animal. It is to be understood that it is within the scope of the present invention to sieve the afore-described dry, milled, raw material and use the "plus fraction" as the animal feed and supplement and use the "minus fraction" for the preparation of substantially pure uric acid. Such an operating technique would result in achieving the maximum benefit out of the dry, milled, raw material.

Even though the feed supplement itself contains non-protein nitrogen, this material is capable of being converted by rumen microorganisms into protein material. Normally, such feed supplements, for instance, urea, are added at the rate of 1 to 2% to an average diet for cattle. Examination of Table III shows the nutrients obtainable, most of which are found in commercially common feed supplements.

While uric acid per se has been found to be a good non-protein, nitrogen source for ruminant animals (Pages 193-202, "Journal of Nutrition," Volume 94, R. R. Oltjen, et al, 1968), this novel animal feed and supplement also has additional advantages such as its mineral, carbohydrate and crude fat concentrations which permit said supplement to be used as a substitute for other nutrients in an animal feed composition. Thus, it has been found that the present invention animal feed and supplement can be used in an animal feed composition in amounts of up to at least 80% by weight, based on the total weight of said composition.

It is to be understood then that the animal feed and supplement of the present invention can be used with or as a complete replacement for any of the usual nutritionally-balanced quantities of carbohydrates, proteins and minerals. Some of these usual dietary elements are grains, such as ground grain and grain by-products; animal protein substances, such as those found in fish meal and meat scraps; vegetable protein like soybean oil meat or peanut oil meat; and bone meal and limestone.

EXAMPLE 1

Approximately 25,000 pounds of wet chicken manure which has a water content of 80% by weight based on the total weight of the wet manure was collected within a 24-hour period of its production. The wet chicken manure was dried in a flash drier at a temperature of approximately 390° F. for a sufficient period in order to form a product which had a water content of approximately 5% by weight thereof. The dried product weighs approximately 5,000 pounds. The 5,000 pounds of dried chicken manure product was passed through a hammer mill and milled to form a product which had an average particle size diameter of about 1,500 microns. This material was sieved using a No. 120 mesh U.S. Standard screen. The plus 120 mesh fraction of the raw material representing approximately 73% by weight of the total raw material, was found to have the following composition:

| Ingredient | % by Weight |
| --- | --- |
| Crude fats | 2.4 |

-continued

| Ingredient | % by Weight |
| --- | --- |
| Silicates | 1.6 |
| Carbohydrates | 8.9 |
| Phosphorus | 2.0 |
| Calcium | 10.7 |
| Magnesium | 0.4 |
| Uric Acid | 5.0 |
| Nitrogen | 4.6 |
| Crude fibers | 11.8 |
| Water | 5.0 |
| Remainder (inorganic anions and other carbon, hydrogen and oxygen moieties) | 47.6 |

Eight Hereford steers averaging about 700 pounds in weight were divided into two groups of four steers each. The first or control group of steers and the second group of steers were fed the following animal feed compositions:

| Ingredient | Control Group (Commercial feed composition) % by Weight | Second Group (Present invention animal feed composition) % by Weight |
| --- | --- | --- |
| Dried, milled chicken manure ("plus 120" fraction) | — | 70.0 |
| Beet pulp | 10.0 | 3.0 |
| Fat | 2.0 | 1.0 |
| Barley | 73.5 | 26.0 |
| Alfalfa hay | 6.0 | — |
| Molasses | 6.0 | — |
| Mineral supplement | 2.5 | — |
| TOTAL | 100.0% | 100.0% |

The control group and second group of steers were respectively fed about 20 pounds per day of the afore-described feed compositions over a 130-day period. At the end of this 130-day period the control group had an average weight of about 1,010 pounds while the second group which was fed on the present invention feed composition had an average weight of about 1,100 pounds. Thus, the first group had 44.3% increase in weight as contrasted to 57.1% increase in weight which was experienced by the second group. No adverse effects were noted by feeding the second group the present invention feed composition.

EXAMPLE 2

A method for preparing ruminant feed supplement was utilized to obtain nutrients according to the breakdown in Example 1. Chicken manure was collected within 24 hours of its production and dried in a flash drier at 380° F. The dried material was passed through a ball mill and sieved into a fraction of −120 mesh. The less than 120 mesh particle size fraction represented 57% of the weight of the original dried chicken waste. The separated fractions gave substantially the same analysis as shown in Example 1. The product was tested and found to contain no live organisms after the drying. The material was added at the rate of 2% as a food supplement to a feed of 10% hay and 88% milo.

EXAMPLE 3

Example 1 was repeated again with the sole exception that the milled, dry, raw material is not sieved but used as such. Substantially the same results are achieved as found in Example 1.

It is quite apparent from the foregoing results that the present invention feed composition is suitable for feeding various animals. Either or both fractions or the total product is useful as feed.

If it is desired to use the waste product for obtaining uric acid in a pure form, the material is then further treated. Methods according to this invention have been devised for obtaining uric acid from the material by both continuous and batch processes. Generally, however, the type of treatment is the same and will be disclosed in that manner when a specific example is given for either the batch or continuous process.

The methods described are equally applicable to a chemical treatment for purification of the waste material for obtaining not only uric acid but monosodium urate or at least a monosalt of uric acid.

The next step, heretofore set forth, is the reaction of the raw material which passes through preferably an 80 mesh screen or any fraction containing a majority of the uric acid, based on the total weight of the uric acid before the milling and screening, with a sufficient amount of an aqueous alkaline solution in order to dissolve the uric acid and separate it from the remaining matter in the raw material. This reaction between the uric acid enriched raw material and the aqueous alkaline solution results in a slurry which contains insoluble material. It is found by this reaction step that the uric acid which is in the form of a salt thereof is dissolved in the aqueous alkaline solution but that the majority of the remaining raw material is insoluble and consequently can subsequently be removed.

It is to be understood that the term "aqueous alkaline solution" used herein covers any aqueous solution containing any inorganic material or organic material which will provide a pH of aqueous solution of at least 6.5, preferably greater than pH 9, and most preferably greater than pH 10. Furthermore, the inorganic or organic material is any alkaline material which will provide a cation which forms a salt with uric acid and consequently allows the uric acid to be substantially completely dissolved in the aqueous alkaline solution. The inorganic material can be sodium, lithium, potassium and ammonium hydroxides, carbonates, bicarbonates, phosphates and nitrates. The organic material which can be utilized can be alkali metal acetates such as sodium acetate and alkali metal citrates such as sodium citrate. It is also within the scope of the present invention that various amines which will provide the amine salts of uric acid which are soluble in an aqueous alkaline solution can be utilized. The water soluble amins such as low molecular weight amines, having a molecular weight below about 300, are preferred. Illustrative of such amines are the alkyl amines, alkylene amines and alkanol amines containing not more than 2 amine groups, such as ethyl amine, diethyl amine, propyl amine, propylene amine, hexyl amine, 2-ethyl hexyl amine, N-butyl ethanol amine, triethanol amine and the like.

It is to be understood that mixtures of both the inorganic and organic materials can be utilized. Of the materials heretofore set forth, the sodium, lithium and potassium hydroxide materials are preferred; and the sodium hydroxide material is the most preferred material. It is also within the scope of the present invention that a brine solution such as sodium chloride can be utilized in order to enhance the solubility of the uric acid material.

The amount of alkaline material in water used in conjunction with the uric acid enriched raw material passing through the desired sieve, is at least sufficient to adjust the aqueous alkaline solution to a pH of 6.5, preferably greater than 9, and most preferably greater than 10. In conjunction with the experimentation with the processes of the present invention, it has been found that the alkaline material is usually present in an amount of from about 2% to about 20% by weight, based on the total weight of the uric acid enriched raw material passing through the desired sieve. However, any amount can be used as long as the specific pH limitations described above are met.

In conjunction with the aqueous alkaline solution, the solvent therein is preferably water. It is desirable to have a weight ratio of solvent to raw material (being treated) of from about 5:1 to about 1,200:1 and preferably from about 10:1 to about 50:1.

While this step in the novel processes of the present invention utilizes water as the solvent in the aqueous alkaline solution as heretofore defined, it is also within the scope of the present invention to utilize a non-aqueous alkaline solution, with the condition that the solvent which contains the alkaline material is such that will permit the salts of uric acid to be dissolved therein. For example, certain types of alcohols, ketones and ethers would permit the substantially complete dissolution of the uric acid salts therein.

In conjunction with the experiments carried out regarding the present invention, it was also discovered that, when the aqueous alkaline solution contains an electrolyte therein, the combination of the electrolyte and alkaline material results in a favorable increase in the yields of the uric acid. It is to be understood that any commonly known type of electrolyte can be utilized as long as there is no adverse effect in conjunction with achieving the desired end-result. In general, the alkali metal, alkaline earth metal, halides, nitrates, hydroxides, sulfates and carbonates are to be considered as within the scope of the present invention. The preferred electrolyte for utilization in the present invention processes is sodium chloride. While some of the electrolytes would also fall within the definition of the alkaline material used in conjunction with the aqueous alkaline solution, it is to be understood that the selection of the particular electrolyte utilized is predicated upon the use of a different type of alkaline material. For example, where one utilizes an aqueous sodium hydroxide solution as the dissolution medium for the uric acid, the electrolyte would not be an additional amount of sodium hydroxide but another compound such as sodium chloride.

The amount of electrolyte utilized will vary, depending upon, for example, such factors as the temperature of the aqueous alkaline solution, pH thereof and desired rate of dissolution of the uric acid therein. However, it has been found during the experimentation of the present invention that the amount of electrolyte utilized is preferably from about 0.01% to about 50% by weight based upon the total weight of the uric acid enriched raw material being dissolved in the aqueous alkaline solution. It is to be understood that any amount can be utilized, however, as long as the electrolyte is effective in achieving the desired end result which is generally the increase in the yield of the pure uric acid.

The next step of the processes involves the removing of the insoluble material from the slurry formed by the reaction of the aqueous alkaline solution with the uric acid enriched raw material, i.e., that raw material which has passed through the desired sieve. Any liquid/solid separation technique can be utilized in order to carry out this operation. For example, such engineering techniques as decantation, filtration and centrifuging can be utilized. In carrying out the processes of the present invention on a commercial scale, it is found that the preferred removal technique is centrifuging.

Immediately prior to the step of removal of insoluble material from the slurry, it is sometimes desirable to age the slurry formed in the preceding step, preferably by stirring the slurry for a sufficient period of time to insure complete dissolution of the uric acid contained in the raw material. Preferably this aging takes place over a period of from about one minute to about sixty minutes; however, where the time is not critical, the aging can be for any period, for example 24 hours or longer.

In the next step, a flocculating agent is contacted with the solution obtained from the first slurry in order to form a second slurry containing additional insoluble material. Preferably the contacting of the flocculating agent with the first fluid is carried out with at least intermittent agitation or stirring in order to insure substantially complete contacting with the flocculating agent. The flocculating agent can be any typical and commonly known flocculating agent which does not adversely affect the desired end result. For example, the following flocculating agents can be utilized in the present invention: alkaline earth metals (such as calcium, magnesium and barium), zinc, iron, and aluminum hydroxides, oxides, halides, and acetates and mixtures thereof. The preferred flocculating agent is calcium chloride.

The amount of the flocculating agent employed in the processes of the present invention and particularly in this step thereof is generally in the range of from about 0.01% to about 20%, preferably from about 2% to about 15% by weight based on the total weight of the uric acid enriched raw material being treated. It is thought that the flocculating agent, such as calcium chloride, reacts with any of the lignins remaining in the fluid to form additional insoluble material and which thus results in the formation of a second slurry.

Subsequent to the flocculating step and if one so desires, the second slurry formed by the addition of the flocculating agent can be aged with or without stirring in the manner heretofore described in conjunction with the formation of the first slurry.

In the following step, the additional insoluble material formed due to the addition of the flocculating agent in the above step is removed from the liquid in the second slurry by the same techniques heretofore described. As previously mentioned if one so desires to age the first slurry without stirring and thus permit sedimentation of some of the solid materials therein, the first insoluble material produced need not physically be removed from the overall mixture but may be removed along with the additional insoluble material formed by the reaction of the flocculating agent with the lignins. With the removal of all the insoluble material from the second slurry, there is then formed a second fluid.

In the next step, the above described second fluid is reacted with a sufficient amount of an acidic material to form a precipitate from this second fluid. It is to be understood that the term "acidic material" is any material which, when added to the second fluid, will lower the pH to less than about 6.0 and cause the dissolved uric acid therein to precipitate out of solution. It is preferred that the acidic material be an aqueous solution of a mineral acid. Almost any mineral acid may be employed in the aqueous solution of a mineral acid used in this step in order to precipitate the uric acid from the solution. Hydrochloric and sulfuric acids are preferred, and sulfuric acid is particularly preferred. The preferred sulfuric acid solutions, utilized for this purpose, have a $H_2SO_4$ concentration of from about 30% to about 95% by weight, based on the total weight of the aqueous solution containing said mineral acid.

The amount of acidic material employed is that amount which will result in the second fluid having a pH of less than about 6.0 and thereby precipitating the uric acid. The preferred amount utilized is such that the end pH of the second fluid is less than about 5, preferably from about pH 1 to about pH 4.5, and more preferably less than 4 (for example, from about pH 3 to about pH 3.5).

After precipitation of the uric acid, and if one so desires, the precipitate containing second fluid can be aged, with or without stirring, for a sufficient period of time in order to optimize the precipitation of the uric acid.

The precipitate is then removed from the second fluid in a similar manner as the insoluble material is removed from the slurries as previously described.

The precipitate which is recovered from the second fluid is then reacted with a sufficient amount of an alkaline solution to dissolve substantially all of the precipitate therein to form a third fluid. The aqueous alkaline solution utilized is the same as that heretofore described; however, the amount thereof utilized will be somewhat less than heretofore mentioned, since the amounts and volumes of materials at this point are less than the initial amounts handled in the initial steps of this process.

The uric solution is again precipitated with an acid solution. This precipitate is the substantially pure uric acid which is present in yields of at least about 85% and generally from about 90% to about 95% by weight based on the weight of the total uric acid contained in the "minus fraction," i.e., the initially treated raw material which has passed through the desired sieve. The amount of acidic material utilized is any amount which will provide a pH of less than about 6 and also promote the formation of the substantially pure uric acid precipitate.

The precipitated uric acid or uric salt is washed with an aqueous solution. The water-washed uric acid material is then washed with an inert liquid, non-aqueous organic solvent to remove residual water. Generally alcohols, ethers and ketones are suitable and any may be employed as long as the organic liquid is substantially inert to the uric acid and that the uric acid is substantially insoluble in the organic liquid.

The substantially pure uric acid which has been washed with water, followed by an organic solvent wash, may then be dried at a temperature of less than about 480° F., which is the decomposition point of uric acid, preferably at a temperature of from about 80° F. to about 480° F., and more preferably from about 100° F. to about 300° F. The drying time usually is from a period of about thirty minutes to about six hours.

The resultant product is a substantially pure, water-free, free flowing uric acid. It is significant to note at this point that the uric acid is substantially pure and of a chemical grade type uric acid which is readily adaptable to be utilized for pharmaceutical purposes.

If the uric acid after the last dissolution in the alkaline solution is not substantially colorless or white, it may be further treated to make it substantially colorless. The last alkaline solution containing the dissolved uric acid is heated to a temperature of from 70° F. to about 200° F. It is then passed through carbon-containing material to remove the color producing impurities. The carbon may be mixed with the solution or the solution may be passed through a carbon column. If the carbon is mixed in, this then must be removed with the color causing impurities trapped therein.

The activated carbon is the type commercially available under the trademark Darco S-51 Activated Carbon. One of the physical properties of this activated carbon is its total surface, which is directly proportional to the absorption capacity. It should also be noted that the utilization of activated carbon does not produce or result in any significant pH changes in the uric acid containing solution being treated. While porous, activated carbon was utilized in the examples of the present invention, other types or forms of carbon, i.e., carbon black, lamp-black, boneblack, etc., which have absorption characteristics similar thereto may be used. It is preferred to use an activated carbon having a surface area of from about 200 to about 1,500 square meters per gram. Either the batchwise process or the continuous process of treating the uric acid containing solution with carbon are satisfactory.

The amount of carbon containing material, preferably activated carbon, which is added to the uric acid containing solution is preferably within the range of from about 0.0001% to about 40%, more preferably from about 0.01% to about 20% by weight (dry basis) of the total uric acid in the uric acid containing solution. However, it is within the scope of the present invention that any amount of carbon can be utilized as long as the desired end results are achieved.

If the subsequent separation or removal of the carbon from the uric acid containing solution is to be effected or carried out by filtration when a batchwise process is utilized, a filtering aid such as Dicalite 4200 diatomaceous earth may be added. The amount of a filter aid which is added to the carbon-containing third fluid may be any amount which is effective to achieve the desired end result and is preferably from about 0.001% to about 60%, more preferably from about 0.1% to about 40% by weight of the total uric acid in solution.

After the addition of the carbon and the filter aid into the vessel containing the uric solution, the resultant solution is then agitated for a period of time from about five minutes to about thirty minutes, in order to achieve an adequate dispersion of the carbon and filter aid therein. Subsequently the carbon and filter aid are removed and the uric solution is then processed as theretofore described.

As was previously mentioned, the aqueous alkaline solution should be adjusted to a pH of at least 6.5 to dissolve the uric acid. The solubility characteristics, however, of uric acid and primary salts thereof in various pH solutions allow for a procedure to obtain a substantially pure primary salt of uric acid. Thus, if the aqueous solution is sodium hydroxide, the monosodium urate may be obtained by proper adjustment of the pH. If the aqueous solution is potassium hydroxide, then, of course, the compound precipitated will be monopotassium urate. The primary salts have different solubility characteristics than the uric acid itself and are, therefore, sometimes more desirable.

If one, therefore, dissolves the uric acid in a very highly alkaline sodium hydroxide solution with a pH of greater than 11, the uric acid will be completely dissolved as the disodium salt. If the pH is continually decreased, the primary salt or monosodium salt of uric acid is formed. Thus, primary salts of uric acid may be obtained having an empirical formula of: $MHC_5H_2N_4O_3$. "M" in the empirical formula is a salt from the group consisting of alkaline earth metals. Uric acid itself has a $pK_a$ of 5.7 (Bergman, F. and Dickstein, S., Jour. of Am. Chem. So., 77, 691 [1955]). Thus, at a solution pH of 6.7, 90% of the uric acid will be in the form of monosodium urate with 10% existing as uric acid. At a pH of 5.7, the mixture will be approximately 50% of the primary salt and 50% of the uric acid. At a pH of 4.7 the mixture will be essentially 10% in the form of the primary salt and 90% in the form of uric acid. One can utilize the solubility characteristics of the salts to make it possible by use of the process described herein to precipitate out substantially pure primary salt of uric acid or as substantially pure uric acid itself depending on the pH adjustment.

In the case of sodium hydroxide solution, if the pH is adjusted to a preferred pH of 7.8, substantially pure monosodium urate may be precipitated out, however, a broad range of from pH 6.5 to pH 8.5 is satisfactory. If one wishes to obtain uric acid, the pH should be below 5.5 with a more preferred range below pH 4.5 and an ideal pH of 3.5.

As mentioned heretofore, these processes of the present invention can be carried out on a continuous basis instead of a batchwise process. Illustrative of such a process would be the continuous collecting and drying of a suitable raw material, such as wet chicken manure. The dried raw material can be continuously milled and the milled product can be screened on a rotating or moving conveyor which contains a screen (such as a No. 80 mesh U.S. Standard screen) to produce a product having two fractions, the minus-fraction and a plus-fraction. The minus-fraction of the dried raw material can then be fed, along with an aqueous alkaline solution, into a reaction vessel which is equipped with a mechanical agitator and a baffle plate extending in an angular manner across a portion of the top part thereof. A slurry is formed in the top section of said vessel and settles to the bottom of the vessel, whereby the slurry is removed via a screw conveyor. The slurry can then be continuously fed to a centrifuge which removes both the solids and the liquid therefrom, with the liquid being fed into a second reaction vessel which is of similar construction to the first reaction vessel. The resultant slurry is removed from the second vessel in the same manner, fed through a centrifuge, and the fluid injected into a third reaction vessel along with sulfuric acid, to form a precipitate. As the precipitate settles to the bottom and collects, it is removed therefrom by a screw conveyor. The precipitate, which is removed from the third vessel, is then fed into a centrifuge and the precipitate, which is the crude uric acid, is then redissolved in a fourth reaction vessel which contains an aqueous alkaline solution. In this fourth vessel, however, the aqueous alkaline solution and precipitate are fed into the bottom portion of the vessel and the resultant solution merely allowed to flow over the top and collected and conveyed to a fifth vessel. In this fifth vessel, the resultant solution from the fourth vessel is admixed with acidic material such as sulfuric acid to form the final uric acid precipitate which is removed from the vessel by a screw conveyor located at the bottom thereof and extending into said vessel. Subsequently, the precipitate-containing solution is subjected to centrifuging in a manner heretofore described.

A further understanding of the processes and compositions of this invention will be obtained from the following specific examples which are intended to illustrate the invention but not to limit the scope thereof, parts and percentages being by weight unless otherwise specified.

EXAMPLE 4

Chicken waste which was collected within a 24-hour period of its production was dried at a temperature of 300° F. Subsequent to the drying, the material was passed through a hammer mill and sieved over an 80 mesh screen. One hundred pounds of the less than 80 mesh material was then passed into an extraction tank containing 375 gallons of water, 15 pounds of sodium hydroxide, and 30 pounds of sodium chloride. The pH of this extraction solution was adjusted to 11.3. The mixture was agitated for 30 minutes and centrifuged. To the effluent from the centrifuge, which was approximately 360 gallons, was added 9 pounds of calcium chloride. The calcium chloride precipitated most of the lignin contaminants. This mixture was centrifuged and the filtrate heated to 180° F. and passed through a carbon column. The carbon column was packed with 30 pounds of activated carbon commercially available from Pittsburgh Carbon Designated Granular 451. The effluent from the carbon column was acidified to a pH of 3.5 using sulfuric acid. The uric acid precipitate was collected by centrifugation and washed with 5 gallons of water. The final product was finally washed with 3 gallons of methanol and dried. The uric acid was obtained and analyzed to be 98.2% pure uric, approximately 9.8 pounds of uric acid was obtained, which was light tan in color.

EXAMPLE 5

Chicken waste was treated in the same manner as Example 4 except that calcium chloride dihydrate was substituted as the flocculating agent instead of calcium chloride. The mixture was stirred for 30 minutes and then centrifuged and then continued as Example 4. 9.2 pounds of uric acid analyzing to 99.3% purity was obtained.

EXAMPLE 6

Chicken waste of less than 80 mesh and of 100 pounds dry weight was obtained by drying and sieving as in the previous examples. This was placed in an extraction tank containing 375 gallons of water, 15 pounds of sodium hydroxide, and 30 pounds of sodium chloride. The pH of the solution was 11.3. The mixture was agitated for 30 minutes and centrifuged. To the effluent of approximately 360 gallons, was added 9 pounds of calcium chloride dihydrate. This mixture was stirred for 30 minutes and centrifuged. The effluent from the centrifuge was acidified to a pH of 3.5 with sulfuric acid. The precipitated uric acid was separated by centrifugation. The precipitate was slurried and washed in 15 gallons of a 4% by weight sodium phosphate dodecahydrate solution.

Basic wash is carried out using 0.05% to 8% of an aqueous solution of an alkali metal hydroxide or phosphate. The ammonium salts of these anions can also be used. At any rate, the wash removed alkaline soluble impurities and most of the colored impurities from the uric acid precipitate. Regardless of the method used, the uric acid precipitate is dissolved in 30 gallons of 8% aqueous sodium hydroxide solution at 150° F. and passed through a carbon column containing 30 pounds of activated carbon. The effluent was acidified to a pH of 3.6 and the uric acid product isolated by centrifugation. The product was washed with 5 gallons of water and 3 gallons of methanol; 9.3 pounds of dry product which is white in color was analyzed to be 99.6% pure.

EXAMPLE 7

The procedure given in Example 5 was followed except that after the slurrying, the chicken waste in the extraction tank with 375 gallons of water, 15 pounds of sodium hydroxide, and 30 pounds of sodium chloride, 9 pounds of calcium dichloride dihydrate were added and the solution stirred for 15 minutes. The mixture was centrifuged and the process continued following the extraction procedure after the addition of calcium chloride. 9.3 pounds of a white product were obtained and analyzed to be 99.5% pure uric acid.

As was stated, a continuous extraction process has also been developed utilizing the same basic techniques but providing for a continuous flow of materials. The method utilizes dried, ground and separated waste material for the starting material and provides process given maximum extraction efficiency and minimum impurities to obtain chemically pure and biologically acceptable uric acid. The continuous process has three major operations: (1) grinding and sieving, (2) extraction, and (3) purification.

The continuous process can best be shown by Example 8 which follows:

EXAMPLE 8

Four thousand pounds of waste material was collected and processed within 24 hours. The material was dried in a flash drier at a temperature of 140° F. to 390° F. In this specific example, a temperature of 350° F. was used.

The drying operation reduced the material to a weight of 1,000 pounds of dried waste material. The 1,000 pounds of dried waste material was fed into a hammer mill through which the material is passed over in the 80 mesh screen. The size fraction of less than 80 mesh fraction was collected and amounts to 470 pounds of material.

Subsequent to this grinding and drying operation, a continuous extraction process is utilized, utilizing 800 pounds per hour of −80 mesh material which was conveyed continuously into a 1,000 gallon tank. Simultaneous to conveying the dried material to the mixing tank, there was also added 1,440 gallons per hour of water and 150 gallons per hour of 0.1% sodium chloride and 0.5% sodium hydroxide, giving a pH of 11.5. The waste material is retained in the tank for about 30 minutes at this mixing rate.

The material was thoroughly mixed and the extracted liquid results in a dark colored slurried, dissolved disodium urate. The slurry was pumped at a rate of 1,440 gallons per hour to a continuous operational scroll type centrifuge. The dissolved disodium urate was extracted from the sludge material.

The 1,440 gallons per hour of the disodium urate solution was directed to an acidification tank where the liquor was acidified with concentrated sulfuric acid to the acidification tank. A light tan precipitate was formed which is crude uric acid analyzing to about 80% purity. If a 300-gallon acidification tank was used, the retention time for contact with sulfuric acid is about 10 minutes.

Continuing with the continuous operation, the slurry from the acidification tank was pumped at a rate of 1,440 gallons per hour to a second centrifuge, preferably, a basket type centrifuge. Crude uric acid precipitate was collected and separated from the acidic mother liquor at the rate of 87.5 pounds per hour.

The process was continued by collecting 700 pounds of the crude extracted uric acid and fed into an 8,000 gallon mixing tank, to which was added 500 pounds of sodium hydroxide, 300 pounds of a filter aid such as Celite, which is a mixture of diatomaceous earth and clay and 5,820 gallons of water, which has been preheated to 170° F. The pure uric acid was once again dissolved but the ligneous impurity remained out of the solution. The dissolved heated disodium urate was pumped from the mixing vessel at a rate of 730 gallons per hour directly through a positive pressure filter. A clear disodium urate solution of approximately 94% to 96% purity was obtained as an effluent from the filter and was directed through an activated carbon column to remove any remaining dissolved coloring impurities.

The 170° F. effluent was pumped from the carbon column at the same rate of 730 gallons per hour into a 200-gallon acidification tank. To this tank was added concentrated sulfuric acid at a rate of 7 gallons per hour which results in a solution having a pH of 3.0 and retention time of about 10 minutes. Pure uric acid was precipitated out of the solution. The solution containing the slurry of precipitated uric acid was passed through a centrifuge which collects solid uric acid having an analyzed purity of 99.5%. The pure uric acid crystals may be further cleansed and purified to a final analysis of about 99.8% by washing the crystals with a water and methanol wash. After the wash, the precipitated and washed uric acid was dried in an oven to obtain the pure product.

EXAMPLE 9

Example 8 above is repeated except that prior to the final acidification step, there was charged together with the filter aid, 250 pounds of Darco activated carbon. The slurry was then acidified and dried according to Example 8. The end product had a purity of 98.3% uric acid with an extremely white coloration to the product.

The procedure according to Examples 8 and 9 has been conducted using hydrochloric acid instead of sulfuric acid as the acidifying agent. Essentially the same results were obtained with hydrochloric acid. Phosphoric acid will also give the same results.

The procedure according to Example 8 has also been conducted except that potassium hydroxide, lithium hydroxide and sodium carbonate are used instead of sodium hydroxide as the alkaline material in solution to dissolve the uric acid with substantially identical results. Economic factors will govern the choice of caustic material with sodium hydroxide being the preferred caustic at the present state of relative cost factors.

It is also within the scope of the present invention that, as an alternative to the use of the carbon treatment to remove color-causing impurities, immediately prior to the final drying step, the precipitate can be washed with a dilute aqueous solution of an alkali metal and ammonium hydroxides and alkali metal phosphates, e.g., sodium phosphate or sodium hydroxide. It is desirable that the concentration of said solution be less than about 0.1 Normal. Furthermore, the temperature of the solution must be less than about 25° C. These conditions are necessary in order to prevent the uric acid from being dissolved in said solution.

EXAMPLE 10

Example 8 is repeated in the same manner as described above with the sole exception that turkey manure is used as the starting raw material instead of chicken manure. The uric acid content in the turkey manure is found to be similar to that in the chicken manure. Substantially the same results are obtained in this Example 10 as those results obtained in Example 8.

In conjunction with the foregoing examples of the present invention, Examples 1 and 2 of U.S. Pat. No. 2,302,204 are repeated in the exact manner as described in this publication in order to obtain comparative yield data between the present invention processes and the processes of U.S. Pat. No. 2,302,204. In this repeat it is found that the uric acid yields, based on the total uric acid content of the actual material being treated, are 56% and 61% by weight, respectively, for Examples 1 and 2. These results are contrasted to the yields found in the above present invention examples, i.e., 90%–95% by weight. Thus, the present invention advantages are quite vividly illustrated. As mentioned heretofore, one of the important features of the present invention is the preparation of uric acid in high yields and which has been unobtainable in practicing the prior art processes.

Examples 11 and 12 are indicative of the effectiveness of this process for obtaining primary salts of uric acid by proper adjustment of pH. This was previously explained. Examples 11 and 12 show how effective this procedure can be.

EXAMPLE 11

The same procedure was followed as in Example 4 except that the effluent from the carbon column was acidified to a pH of 7.5 using sulfuric acid. The monosodium urate precipitate was allowed to settle over night. The final product of precipitate collected was washed with methanol and dried. The precipitate was analyzed to be 98.5% monosidium urate.

EXAMPLE 12

The same procedure was used as in Example 4 except that the extraction tank contained 15 pounds of potassium hydroxide and 30 pounds of potassium chloride. The procedure was continued as shown except that the effluent from the carbon column was acidified to a pH of 7.7 using sulfuric acid. Monopotassium urate was collected as the precipitate, washed and dried and analyzed to be 97.9% monopotassium urate.

While the particular embodiments of the present invention have been shown and described specifically in the examples heretofore set forth, it will be obvious to those skilled in the art that changes and modifications may be made without departing from this invention in its broader aspects.

What is claimed is:

1. The method of increasing the yield of uric acid from uric acid bearing excrement comprising the steps of:
    first collecting suitable uric acid bearing waste material within a period of eight days after production of said excrement; and
    subsequently, immediately thereafter, drying the collected excrement at a temperature of at least 350° F. to destroy microorganisms to prevent decomposition of said uric acid by said microorganisms.

* * * * *